United States Patent [19]
Gilmore

[11] Patent Number: 5,623,245
[45] Date of Patent: Apr. 22, 1997

[54] REMOTELY ACTIVATED VEHICLE ANTI-THEFT AND ANTI-CARJACKING DEVICE

[76] Inventor: Jack R. Gilmore, 19201 N. 17th Dr., Phoenix, Ariz. 85027

[21] Appl. No.: 509,046

[22] Filed: Jul. 31, 1995

[51] Int. Cl.$^6$ ...................................... B60R 25/10
[52] U.S. Cl. .................. 340/426; 340/429; 340/825.72; 307/10.2; 307/10.3; 307/10.6
[58] Field of Search ................... 340/425.5, 426, 340/429, 825.69, 825.72; 455/95; 307/10.2, 10.3, 10.6

[56] References Cited

U.S. PATENT DOCUMENTS

| | | | |
|---|---|---|---|
| 4,740,775 | 4/1988 | Price | 340/426 |
| 4,958,084 | 9/1990 | Carlo et al. | 340/426 |
| 5,307,048 | 4/1994 | Sonders | 340/426 |
| 5,382,948 | 1/1995 | Richmond | 340/426 |
| 5,444,430 | 8/1995 | McShane | 340/426 |
| 5,477,090 | 12/1995 | Davis | 340/825.69 |

Primary Examiner—Jeffery Hofsass
Assistant Examiner—Daniel J. Wu
Attorney, Agent, or Firm—Gregory J. Nelson

[57] ABSTRACT

An anti-theft and anti-carjacking system for an engine powered vehicle. The system has a remote transmitter which selectively operates a vehicle mounted receiver and switch. The switch, when actuated to a selected position, interrupts electrical continuity. The transmitter is compact and is preferably embodied in an article carried or worn by the driver such as a wristwatch. In the preferred embodiment, activating the system to the anti-theft or armed condition will also engage an internally mounted lock in the engine compartment to prevent attempts at circumventing the system.

10 Claims, 2 Drawing Sheets

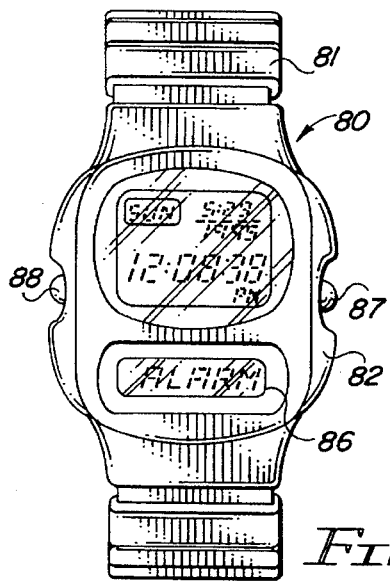
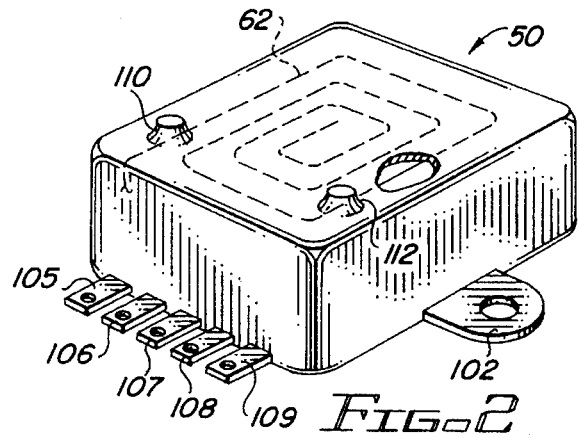
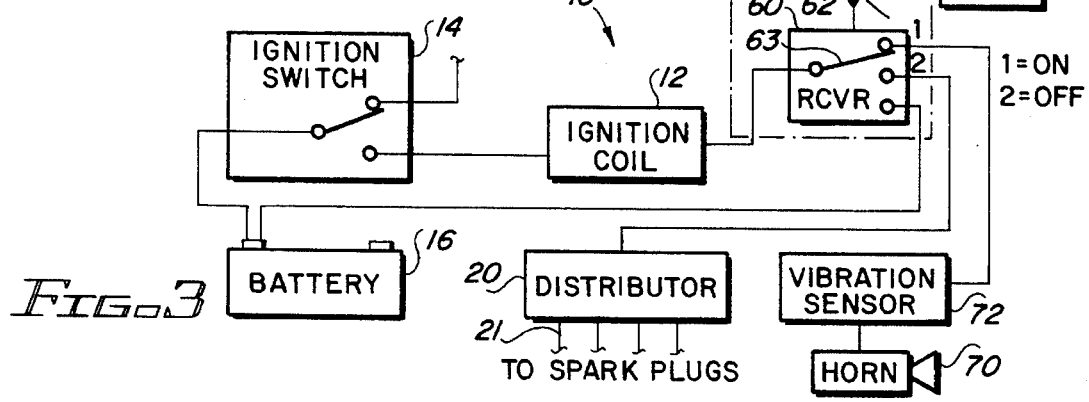
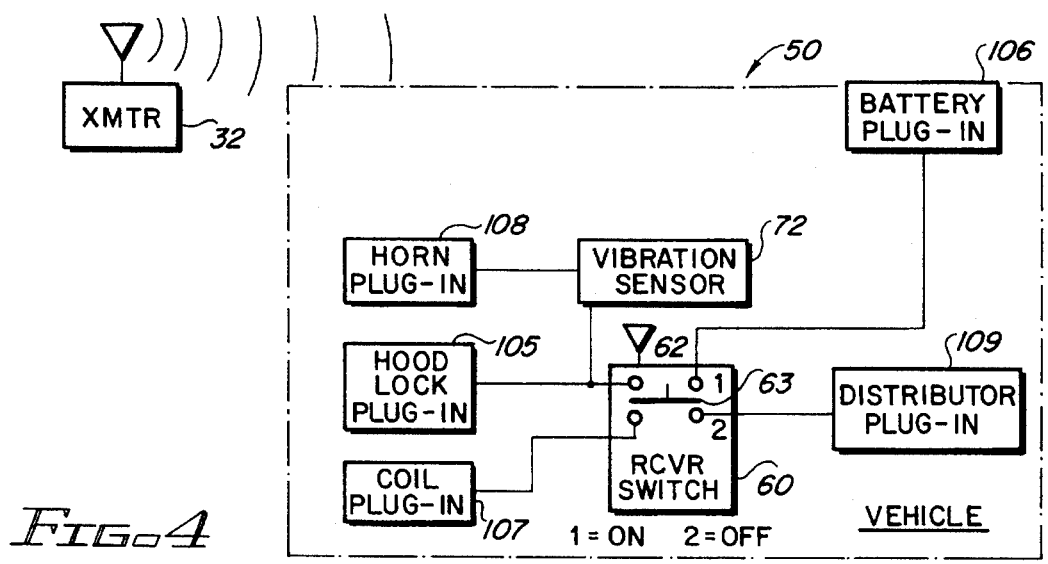

REMOTELY ACTIVATED VEHICLE ANTI-THEFT AND ANTI-CARJACKING DEVICE

BACKGROUND OF THE INVENTION

1. Field of the Invention

The present invention relates to a device to deter and prevent theft of vehicles. More particularly, the present invention relates to a remotely actuable device which will interrupt the electrical system of the vehicle so that the operator of a vehicle may safely disable the vehicle from a distance when it is parked or immediately after the owner has been forced from the vehicle in a carjacking.

2. Background of the Invention

Automobile theft is a serious crime which is increasing in magnitude. Theft of automobiles results in enormous cost to society in the form of higher insurance rates and taxes for additional police enforcement. In some instances automobiles are stolen for their value. It has recently been estimated that auto theft is about the sixtieth largest "business" in the United States. Stolen automobiles may be sold by the thieves or the automobile may be stripped of its valuable components such as electronic components and other parts. However, recently increases in a type of auto theft known as "carjacking" has occurred. Carjackings are particularly serious because the automobile is generally stolen from the driver of the vehicle while it is occupied. The driver is ordered from the automobile at gun point and the hapless driver watches the thieves drive away in the automobile. The stolen automobiles are sometimes used for joy-riding or may be used in the commission of another crime. Drivers who resist carjackers are subject to being assaulted or shot.

Various anti-theft devices for vehicles can be found in the prior art. One of the most common types is an internal lock on the steering mechanism of the vehicle. However, these locks can easily be broken and circumvented by thieves. Other locking devices such as steering wheel lock bars such as the widely advertised device advertised under the trademark "The Club" are used.

Various electronic alarms have been employed which emit an audible signal or siren in an effort to reduce or deter theft. However, these devices are often ignored by passers-by since they are subject to falsing.

While the aforementioned alarms and anti-theft devices are, to some extent, effective in discouraging theft of unattended automobiles, they generally have little or no effect on carjackings. Carjackings often occur in parking lots or at traffic control signals and the operator is threatened and forced to exit the automobile. Thereafter the thief drives away with the vehicle.

The present invention addresses the need for an effective system to prevent and deter carjacking. Also, the present invention is described with reference to use in an automobile but it is to be understood that the present invention has application to various types of vehicles including boats, trucks and even construction equipment where theft is a problem.

The present invention is effective in carjacking situations and also is an effective theft preventative device when a car is left unattended in a parking area.

Various prior art patents which are representative of the current state-of-the-art-art relative to vehicle security devices for deterring and preventing are as follows.

U.S. Pat. No. 5,276,728 describes a system which allows the owner of a stolen automobile to dial a telephone number which causes a signal code to be transmitted from a mobile telephone network. When the signal is received by the automobile and matches a program disabling code, the automobile is disabled.

U.S. Pat. No. 5,280,267 discusses vehicle anti-theft devices of the type having a self-contained battery powered transmitter which are activated by a push button and which may be carried by the user. By depressing the push buttons, the user may send a coded signal at a high frequency which is received by a central unit. If the correct code is received, the central unit will activate or de-activate the device which blocks operation of the vehicle engine.

U.S. Pat. No. 5,382,948 discloses an anti-carjacking device which may be remotely operated by the vehicle operator who has been forcibly removed from his or her vehicle. The device performs alarm signaling functions and also operates to lock the vehicle doors and windows to confine the thief within the vehicle.

U.S. Pat. Nos. 5,298,878 and 5,360,997 disclose somewhat similar devices. These devices rely on the use of a hidden or disguised switch which may be operated by the driver in the event of a carjacking. After a predetermined period of time, the switch will operate to disable the automobile. The device of the '878 patent also has provision for a device that will activate the horn and disperse teargas through the vehicle ventilation system once the vehicle is disabled.

Accordingly, while there are various vehicle tracking and anti-theft devices available, there still exists a need for a simple, effective system to protect vehicles and deter carjackings.

It is therefore a broad object of the present invention to provide a remotely activated automobile disabling system which allows the driver to disable the vehicle exteriorly of the vehicle by interrupting the electrical system of the vehicle.

It is a broad object of the present invention to provide a vehicle security system of the general type which is adaptable for retrofit installation in existing vehicles and may be provided as original equipment on new vehicles.

Another object of the present invention is to provide a vehicle security system which can be remotely activated by a carjacking victim after the victim has exited the car and is a safe distance from the vehicle.

It is an object of the present invention to provide a remotely actuable security system which has a transmitter which is worn or carried by the operator and which will also when activated lock the engine compartment to prevent the would-be thief from destroying, disarming or bypassing the system.

Another object of the present invention is to provide a system that utilizes the existing vehicle horn as an audible alarm device.

Yet another object of the present invention is to provide a security system for vehicles which includes a motion or vibration sensor that is sensitivity adjustable to detect attempted break-ins.

Another object of the present invention is to provide a vehicle security system which is simple, relatively low in cost and which is easily installed by the mechanic or vehicle owner.

SUMMARY OF THE INVENTION

The present invention provides a system by which a vehicle operator may remotely disable a vehicle. The vehicle may be one which has been parked by the driver and after the driver exits, the system may be actuated to disable the electrical system to prevent theft. The system also may be remotely actuated by a driver who has been forced from his vehicle while the vehicle is being driven away by a carjacker. The system includes a remotely controlled receiver module which is installed in the car and to which a remote signal can be communicated by radio frequency or other type of signal such as infrared. A remote transmitter is of a size that can be easily carried by the vehicle operator in a pocket, pinned to the clothing or worn as a pendant or part of a wristwatch or beeper. It is important that the remote unit not be attached to the vehicle keys but rather be maintained on the person of the driver.

The remotely controlled module includes a receiver and a switch. The switch is interposed in the ignition electrical system of the automobile, preferably between the distributor and the coil. In the normal operational position, the switch is positioned to maintain electrical continuity between the distributor and the coil. If the system is actuated, the control module will receive the remote signal at the transmitter and cause the switch to move to a second position interrupting the electrical continuity between the coil and the distributor.

In other embodiments of the invention, the system when in the "on" position will connect the vehicle horn to a source of power such as the battery across a vibration sensor. Also, in the alternate embodiment, when the receiver control unit is actuated to the "on" position, an internal lock within the engine compartment is secured to prevent a potential thief from attempting to circumvent or bypass the system by hot-wiring the electrical around the receiver controller.

BRIEF DESCRIPTION OF THE DRAWINGS

The above and other objects and advantages of the present invention will be more fully understood and appreciated from the following description, claims and drawings in which:

FIG. 1 is a wristwatch to be worn by the driver containing the transmitter which remotely actuates the system;

FIG. 2 is a perspective view of the control unit which may be installed as original equipment in a vehicle or retrofit as an after-market item;

FIG. 3 is a schematic diagram of the vehicle disabling system;

FIG. 4 is a schematic diagram of an alternate version of the vehicle disabling system;

DETAILED DESCRIPTION OF THE DRAWINGS

Figure 5:
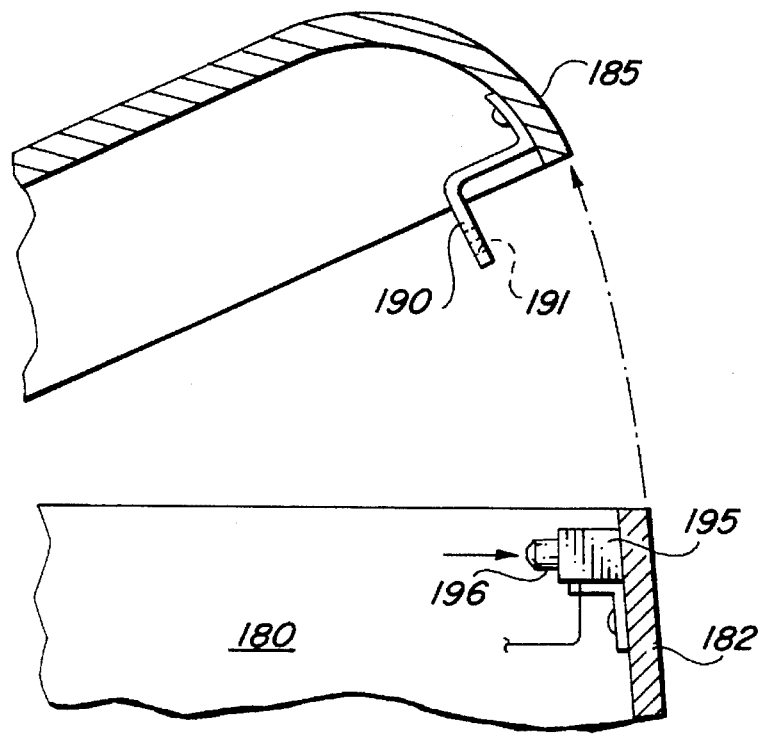
FIGS. 5 and 6 illustrate a remotely actuable lock that may be installed within the engine compartment and controlled by the remote disabling system of the present invention.

Referring now in detail to the drawings, the reference numeral 10 generally denotes a vehicle security system in accordance with the present invention. The security system shown schematically in FIG. 3 may be used to disable any type of motor driven vehicle such as an automobile, truck, construction equipment, boat or the like. Vehicles of these types have an electrical system, certain components of which are shown such as an ignition coil 12, which is connected to an ignition switch 14 which is normally a key-operated switch. Most automotive systems operate at 12 volts with the negative side grounded. The following is a brief description of the typical electrical system for a vehicle and is set forth to aid in an understanding of the invention.

The alternator or generator in automotive electric systems is driven by the engine through a belt drive and when in operation is connected to the battery. Automotive systems include a voltage regulator and a coil is connected across the terminals of the battery when a circuit breaker is closed. Initially, when the vehicle is first started, the ignition key is turned and the battery is connected to the starter motor across a starter relay and solenoid starting switch. Once the engine begins to run, the starter motor is disconnected from operation. When the starting relay is closed, the circuit to the solenoid or the starting switch is closed. The pinion on the motor shaft engages with the gear teeth of the flywheel cranking the engine until it starts.

The ignition key also closes a circuit to a terminal and the horn relay which terminal is, in turn, connected to the interrupter and the primary of the ignition coil through the coil resistor. Once the starting sequence has been completed, the alternator or generator provides the electrical energy to maintain the battery in a charged position. Current flows from the battery positive through the primary of the ignition coil through a resistor to contacts in the distributor. The contacts or points are operated by a cam or rotor. The secondary of the ignition coil is connected between the battery positive and the distributor. The cam or rotor causes the contact points to be closed for a sufficient time to build up the magnetic field in the ignition coil. The contacts or points open suddenly and current is interrupted and a high EMF is induced in the secondary. The distributor connects the high voltage terminal of the ignition coil to the spark plugs associated with the cylinder which is firing at that instant. The firing order varies with the type of engine. A protective resistor is in series with the primary of the ignition coil through the coil resistor. The resistor has a high temperature coefficient to limit current if the ignition current is left closed with the engine not running.

The foregoing is a general discussion of ignition systems which will assist in an understanding of the present invention. Some new vehicles have electronic systems but still utilize a coil and distributor as part of the electrical system.

It will be appreciated that the present invention is adapted for use with various types of engine electrical systems and the particular electrical system forms no part of the invention.

FIG. 3 is a very simplified schematic of an engine system representative of conventional and electronic ignition systems and is shown with battery 16 being shown connected across ignition switch 14 to coil 12. The secondary of the ignition coil is connected between the positive battery terminal and the distributor 20. The distributor arm connects the high voltage terminal of the ignition coil to the spark plugs 21 associated with each cylinder.

The system of the present invention includes a transmitter 30 which may be an RF transmitter or one which transmits other types of signals such as infrared signals. The transmitter, if transmitting in the RF range, would operate at a certain selected frequency, as for example in the range of 100 to 300 Khz by means of an antenna 32. It is preferred that the system provided the various users operate at various selected frequencies within the frequency operating range. In this way, a transmitter 30 would activate only receiver controllers specifically matched to the transmitter and would not activate another system of the same design.

Receiver 60 is associated with the controller 50 and also has an antenna 62 and is capable of receiving the first frequency transmission sent by the transmitter 30. The receiver is programmed so that upon receipt of a signal of predetermined frequency, will move the associated interrupter or switch 63 to one of the positions 1 or 2. Switch 63 may be a relay operated switch. Position 2 is shown to be the normal vehicle operating position in which the ignition switch 14 and coil 12 are electrically connected to the distributor 20. If the switch 63 is caused to move to switch position 1, the armed position, by means of the remote transmitter 30, the horn 70 is then placed in electrical connection with battery 16 across motion sensor 70 causing the horn to be activated if the vehicle is rocked and simultaneously interrupting the supply of electrical energy to the distributor so the vehicle engine is inoperative. In the event the driver has been forced from the car and is standing by as a carjacker or thief drives away with the car, this mode of operation would be initiated. The car operation will stop and the continued motion of the car will activate the horn, causing attention to the situation and most likely causing the thief to bolt from the scene.

Switch position 1 may also be selected if the driver were parking the car in a parking lot and the car is to be left unattended. In this case, as a security measure in addition to the normal security measures of locking the car, the remote transmitter 30 carried with the driver could be actuated to cause the switch 63 to move to switch position 2 which interrupts the electrical system so that the vehicle can not be started by a potential thief braking into the car and attempting to "hot-wire" the car. The horn 70 would not be immediately actuated as the driver of a car would not want the horn blaring while the car was in a parked condition. The horn is connected across vibration sensor 72 so attempts at a break-in will cause the horn to sound. However, attempts at starting the car would be thwarted by lack of electrical continuity between the coil and distributor.

The remote transmitter 30 is compact and, as indicated, may be an RF transmitter or may emit an infrared or other output signal. Normally, the system would be actuated at a distance of 100 to 300 yards or less so an IR signal is suitable for this purpose. Remote RF signals for automobile security systems are known and are discussed in U.S. Pat. No. 5,276,728. Infrared remote systems are well known and are commonly used to operate devices as television monitors and are used in keyless entry systems for automobiles. Accordingly, detailed discussion of these types of remote control systems is not believed necessary as they are well known to those skilled in the art.

The remote transmitter 30 should be of a size that can be easily carried on the person of the vehicle operator. It is preferred that the transmitter be located in an object that would remain with the operator and not be likely to be left in the automobile. Accordingly, the transmitter could be made as a component of a piece of jewelry worn by the operator. A particularly suitable object for housing the transmitter is a wristwatch 80 such as that shown in FIG. 1. A conventional wristwatch would have wrist band 81 and a case 82. The case 82 contains a small RF or IR transmitter and a suitable power source such as a small battery. The wristwatch could also provide the normal timekeeping and alarm functions. The watch 80 is shown with a digital display 86 which indicates the mode of operation of the system. The transmitter is actuated by depressing either button 87 or 88. Button 87 will place the transmitter in an operative condition causing switch 63 to assume position 1 while operating button 88 would cause receiver switch to move to operational switch mode 2.

FIG. 2 illustrates a representative housing unit which contains the controller 50 of the present invention which has a receiver 60. As indicated, the controller 50 can be provided as an aftermarket item and to this end it should be convenient for the mechanic or operator to install. Accordingly, the housing may be any suitable shape shown as generally rectangular having one or more brackets 102 which may be secured to the interior of the engine compartment by a suitable fastener. The housing is provided with terminals 105, 106, 107, 108, 109 which are respectively for connection to the hood lock, battery, coil, horn and distributor. Alternate coil and distributor connections 110 and 112 are shown and provided on the top surface of the housing for convenience in the event a plug in rather than knife-like connections are utilized. Antenna 62 is embedded in a housing surface.

FIG. 4 shows a schematic of an alternate embodiment of the present invention which operates in generally the same manner as that of FIG. 3. However, this embodiment includes an additional theft deterrent device, that of a locking device. The same numerals as used in FIG. 3 are used in FIG. 4 to denote the same or similar components or elements. Again, the controller 50 may be contained within a suitable housing within the engine compartment and connected to the electrical system of the invention. The system includes the controller module 50 and remote transmitter 32. The receiver 60 operates a switch 62 which has a first and second position indicated by the numerals 1 and 2 on switch 62. In the second switch position, the coil is placed in direct electrical connection with the distributor across the plugs and the vehicle ignition system operates in normal manner. When the remote transmitter is actuated, the receiver will cause the switch to change position to switch position 1 in which case the electrical continuity between the distributor and coil is interrupted. The automobile horn is placed in electrical connection with the battery across the vibration sensor. Thus, if the car is parked and the system activated, attempts to break into the car will result in vibrations occurring which will cause the horn to sound calling attention to the attempted break-in. Switch position 1 places hood lock 150 in electrical connection with the battery. The hood lock is located within the engine compartment and upon energization will lock the hood and obstruct access to the engine compartment from the exterior. In this way, a potential thief will find it very difficult to circumvent the system by hot wiring. Time is important to thieves and this feature will cause thieves to seek another vehicle.

Figure 6:
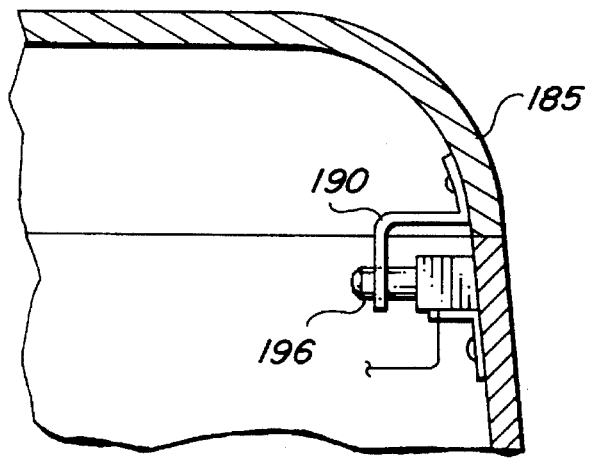

The hood lock is shown in FIGS. 5 and 6. The engine compartment is represented by the numeral 180 having a front or side panel 182. The closure 185 is shown as a conventional automotive hood which pivots to a closed position as shown in FIG. 6. The hood component 185 carries an L-shaped bracket 190 with an aperture 191 therein. Fixed to the interior of the compartment at the inner wall of panel 182 is electric solenoid 195 having plunger 196. When solenoid 196 is actuated, plunger 196 extends to the position shown in FIG. 6. With the hood closed, the plunger will engage the aperture 191 in the bracket so that the hood 185 may not be opened. The plunger is shown as a rod type plunger but may be a latch, screw or other type and may be mounted in any suitable location.

When the driver returns to the vehicle the remote transmitter is operated to cause switch 63 to move to switch position 2, this will result in the solenoid being energized and permitting the plunger to return to its retracted position, also disarming the vibration sensor in the horn circuit. This will also place the automotive ignition system in normal operating condition so the vehicle may be started. The vehicle may be equipped with indicator lights showing the operative condition of the system.

The foregoing description of the present invention is exemplary and it will be obvious to a person skilled in the art to make various, changes, modifications and improvements without departing from the spirit and scope of the appended claims. It will also be apparent that many types of signaling or transmitting systems exist for activating alarms and all such systems are intended to be included herein and may be used with the present invention. Although the present invention has been described primarily with respect to automobiles, the disabling system may be used in connection with electrical systems for almost all types of automobiles, trucks, aircraft, construction equipment and watercraft.

I claim:

1. An anti-theft system adapted to be connected in the ignition system of an engine powered vehicle of the type having an electrical system including a battery, coil, distributor and horn, said apparatus operative to selectively disrupt the electrical system and to disable the vehicle comprising:

(a) a remotely actuable, interrupter device interposed in the ignition between the coil and distributor, said interrupter having at least a first and second position, said second position maintaining electrical continuity between the coil and distributor and said first position interrupting electrical continuity between the distributor and coil and connecting said vehicle horn to said battery; and (b) a remote control device including a transmitter which is adapted to be carried by the person of the driver of the vehicle and operable to send a broadcast signal to remotely actuate said interrupter to move said interrupter from said second to said first position thereby disrupting the electrical circuit of the vehicle to disable the vehicle and to actuate the horn.

2. The system of claim 1 wherein said interrupter is a relay actuable switch and said interrupter includes a receiver operative to receive the signal from said transmitter.

3. The system of claim 2 wherein said broadcast signal is an IR signal.

4. The system of claim 1 wherein said broadcast signal is an RF signal.

5. The system of claim 1 wherein said transmitter is adapted to be incorporated in a personal article worn by the driver.

6. The system of claim 1 wherein said transmitter is incorporated in a wrist-worn device carried by the operator.

7. The system of claim 1 wherein said first position connects the vehicle battery to the horn across a motion sensing device.

8. The system of claim 2 wherein said interrupter and said relay activated switch means is incorporated in a module having mounting means and connection attachable to the electrical system of the vehicle.

9. A vehicle security system for use with a vehicle having an engine, an engine compartment and an electrical system including a distributor, coil, horn and battery, said system comprising:

(a) a transmitter adapted to be carried by the driver of the vehicle, said transmitter operative to emit a selected output signal;

(b) a receiver positionable within the engine compartment, said receiver adapted to receive a broadcast signal when the transmitter is within a predetermined range;

(c) a switch including a switch element remotely positionable by said transmitter interposed in the electrical system of the vehicle between the coil and the distributor and having a second position placing the coil and the distributor in electrical continuity and a first position in which the continuity of the electrical circuit of the vehicle is interrupted; and (d) locking means positioned within the engine compartment and having locked and unlocked positions, said locking means locking said compartment in said locked position, said locking means being electrically connected to said switch whereby placing said switch in said first position will activate said locking means to said locked position.

10. The system of claim 9 further including a circuit connected to said switch means placing said horn in electrical connection with the vehicle battery across a motion sensing device when said switch is in said first position.

* * * * *